(12) United States Patent
Chen (10) Patent No.: US 6,722,859 B1
(45) Date of Patent: Apr. 20, 2004

(54) ELECTROMAGNETIC DEVICE CAPABLE OF CONTROLLING THE REVOLVING SPEED OF A MULTI-FAN ASSEMBLY

(76) Inventor: Chia-Teh Chen, 5Fl., No. 30, Yi Shian Rd., Sung Shan Chiu, Taipei (TW)

( * ) Notice: Subject to any disclaimer, the term of this patent is extended or adjusted under 35 U.S.C. 154(b) by 0 days.

(21) Appl. No.: 10/278,222

(22) Filed: Oct. 23, 2002

(51) Int. Cl.[7] ............................ F04B 17/00; F04B 35/00
(52) U.S. Cl. ...................... 417/326; 417/423.5; 415/60; 416/98; 416/123; 416/210 R
(58) Field of Search ............................. 417/326, 423.5; 416/5, 98, 120, 123, 210 R, 170 R; 415/60, 61

(56) References Cited

U.S. PATENT DOCUMENTS

| | | | | | |
|---|---|---|---|---|---|
| 1,227,291 A | * | 5/1917 | Miller | ......................... | 416/110 |
| 1,295,618 A | * | 2/1919 | Shaw | ......................... | 416/149 |
| 2,312,627 A | * | 3/1943 | Cohen | ......................... | 416/121 |
| 4,357,563 A | * | 11/1982 | Ohno | ......................... | 318/254 |
| 4,560,321 A | * | 12/1985 | Kawai | ......................... | 416/23 |

* cited by examiner

Primary Examiner—Justine R. Yu
Assistant Examiner—Han L Liu
(74) Attorney, Agent, or Firm—Charles E. Baxley (57) ABSTRACT

A multi-fan assembly with a built in electromagnetic control device composed of a magnetic induction mask fixedly received in a space in a rotatable member, a magnetic flux coil fixedly connected to a central main shaft and snugly surrounded by the magnetic induction mask, and a current control unit also fixedly connected to a central main shaft, wherein the current control unit sends a desired current to the magnetic flux coil to produce a magnetic flux which magnetizes the silicon steel core of the magnetic flux coil to attract the metal magnetic induction mask thereby generating a resistant force to reduce the revolving speed of the two member fans round the central main shaft. Three options are designed for manipulating the current coming out of the current control unit; a direct wired wall control switch, or a wireless remote controlling using infra-red design or an automatic speed control using a speed detecting sensor.

11 Claims, 7 Drawing Sheets

ELECTROMAGNETIC DEVICE CAPABLE OF CONTROLLING THE REVOLVING SPEED OF A MULTI-FAN ASSEMBLY

FIELD OF THE INVENTION

The present invention relates to a multi-fan assembly that has an electromagnetic device which generates a magnetic counter force to partially offset the revolution torque on the rotatable member thereby reducing the revolving speed of the multi-fan assembly round its main shaft. In other words, this invention uses an electromagnetic device as a braking unit to replace the mechanical device used in the case of U.S. Pat. No. 6,364,638 B1.

BACKGROUND OF THE INVENTION

To avoid confusion during the course of this presentation, the word "rotation" and "revolution" are defined respectively as follows.

Rotation: the spinning of fan blades of the member fan rounds its own axis or the circular movement of a rotatable member moving round a central shaft.

Revolution: the circular movement of two or more member fans rotating about a common central main shaft.

Figure 1:
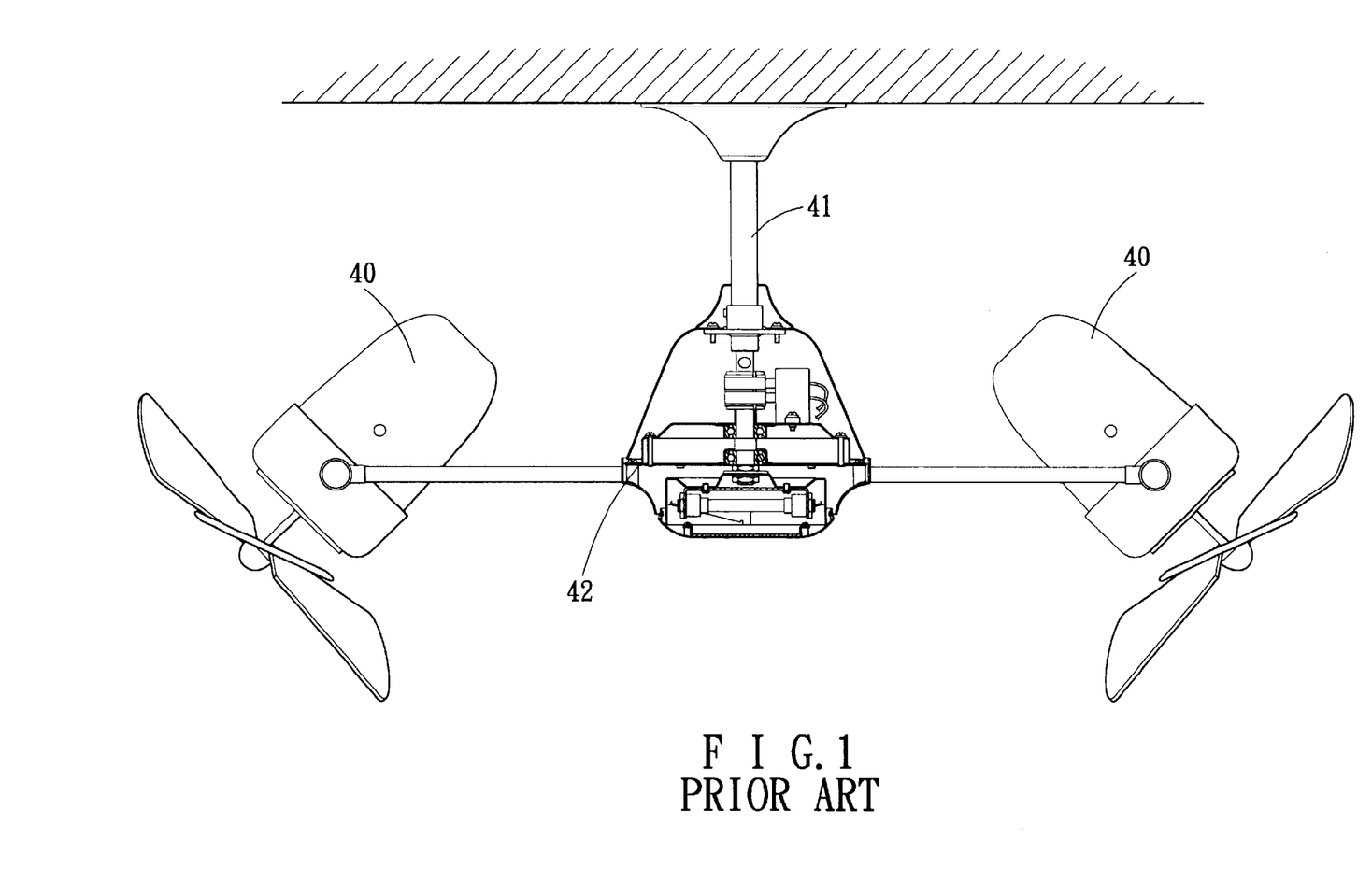
FIG. 1 shows a first embodiment of a conventional multi-fan assembly.

A conventional multi-fan assembly is shown in FIG. 1. It generally includes a main shaft 41 fixed on the ceiling, a rotatable member 42 rotatably connected to the main shaft 41, two or more member fans 40 fixedly connected to the rotatable member 42, and two conductive members 43 fixedly connected to the rotatable member 42 to transfer power to the two member fans 40. Each member fan 40 has its own fan blades which rotate about its own axis. The self rotation of the member fans 40 creates a torque on the rotatable member 42 thereby causing the whole multi-fan assembly to revolve round its main shaft 41. The revolving speed of the multi-fan assembly is determined by the rotating speed of the member fans 40; when the member fans 40 are at low rotating speed, the multi-fan assembly also revolves slowly, and vice versa. The revolving of the multi-fan assembly creates an effect of total air management which gives air movement (wind flow) in all directions round its main shaft. Compared with the traditional fans which only gives a mono-directional air circulation, the revolvable multi-fan assembly is a much more efficient and powerful device for air circulation as well as cooling purpose.

Figure 2:
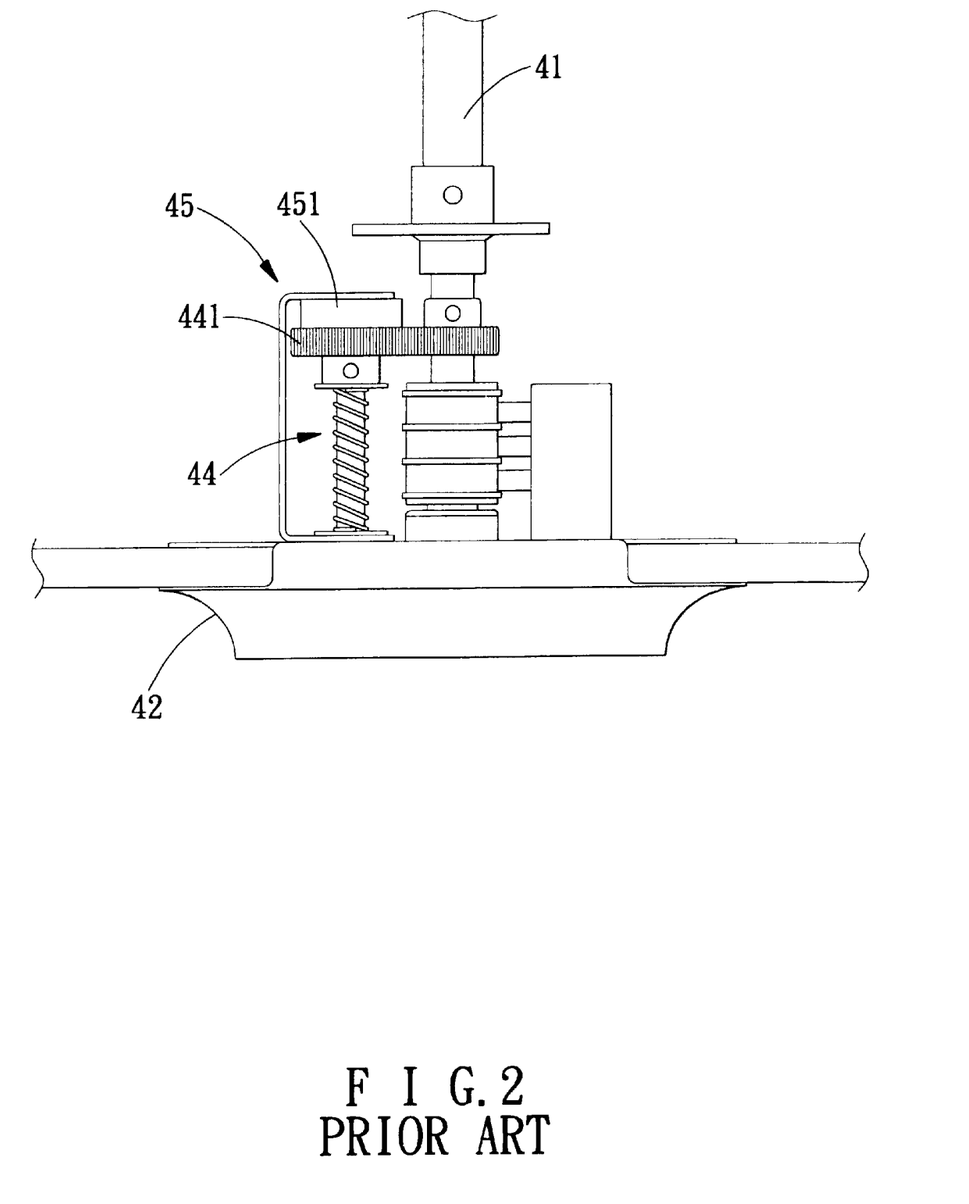
FIG. 2 shows a second embodiment of a conventional multi-fan assembly.

The revolving speed, however, needs to be controlled to the extent that it does not disturb the normal performance of the member fans 40 while still possessing the benefit of the total air management effect. Therefore, in order to reduce the revolving speed a control device using a mechanical structure (U.S. Pat. No. 6,364,638 B1) has been developed in a multi-fan assembly as shown in FIG.2 which includes a gear operated speed reduction device 44 and a friction member 451 connected between the main shaft 41 and the rotatable member 42. Such mechanical control device has the following shortcomings in its role as a braking unit.

(1). It only works well when the member fans 40 are designed with one speed. If the consumers want a much lower or much higher wind flow from the member fans, the control quality for revolution becomes very poor. The reason is the mechanical control device which uses a pair of gear set 44 together with a friction member 451 (as shown in FIG. 2) can only create a fixed load to the rotatable member 42; at lowest fan speed the revolution torque generated by the rotation of the member fans 40 is always not sufficient to overcome the fixed load of the mechanical control device, therefore, the multi-fan assembly often stands still with no revolution effect. On the other hand when the member fans 40 are set at the highest speed, the revolution torque becomes too large for the mechanical control device to control and consequently the fan assembly revolves uncontrollably fast making the total air management effect meaningless. According to the actual performance data, when the member fans 40 are set at a speed of 1500 rpm, the revolution of the two member fans round the main shaft is 120 rpm and when the speed of member fans is set below 400 rpm, the revolution effect doesn't occur. The total air management effect is useful only if the revolution speed can be controlled within an optimum range of 5 rpm to 25 rpm.

(2). The friction member 451 and the gears of the speed reduction device 44 unavoidably make different degree of noises in the course of revolution.

(3). The wearing of the parts of the friction member 451 and the gears of the speed reduction device 44 requires costly replacement and maintenance.

The present invention intends to provide a new technology that can effectively manage the revolution speed of a multi-fan assembly at user's discretion regardless of the rotation speed of the member fans meanwhile it also remedies the other shortcomings as described above.

SUMMARY OF THE INVENTION

In accordance with one aspect of the present invention, there is provided a multi-fan assembly which comprises a central main shaft, a rotatable member rotatably connected to the central main shaft, two conductive members and two fans connected to the rotatable member. Two conductive pieces are connected to the central main shaft and the two conductive members receive power from the two conductive pieces and transfer power to the two member fans. Additionally an electromagnetic control unit is built in the space between the central main shaft and the rotatable member. The control unit includes a magnetic induction mask fixedly received in a space in the rotatable member, a magnetic flux coil fixed to the central main shaft and snugly surrounded by the magnetic induction mask, and an electric current control unit also connected to the central main shaft. The magnetic induction mask is composed of array of mutually insulated inductible metal bars parallelly fixed along the inner circular wall of the magnetic induction mask. The magnetic flux coil is composed of stack of silicon steel sheet coiled with copper wires. The electric current control unit controls the current going into the magnetic flux coil and consequently the magnetic induction mask and the rotatable member together are magnetically attracted by silicon steel of the magnetic flux coil thereby creating a magnetic counter force to partially or completely offset the revolution torque generated by the rotation of the two member fans. The strength of magnetic counter force is determined by the level of current provided by the current control unit. Therefore, the revolving speed of the multi-fan assembly round its central main shaft can be managed at user's discretion by simply adjusting the level of current going into the magnetic flux coil.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 3:
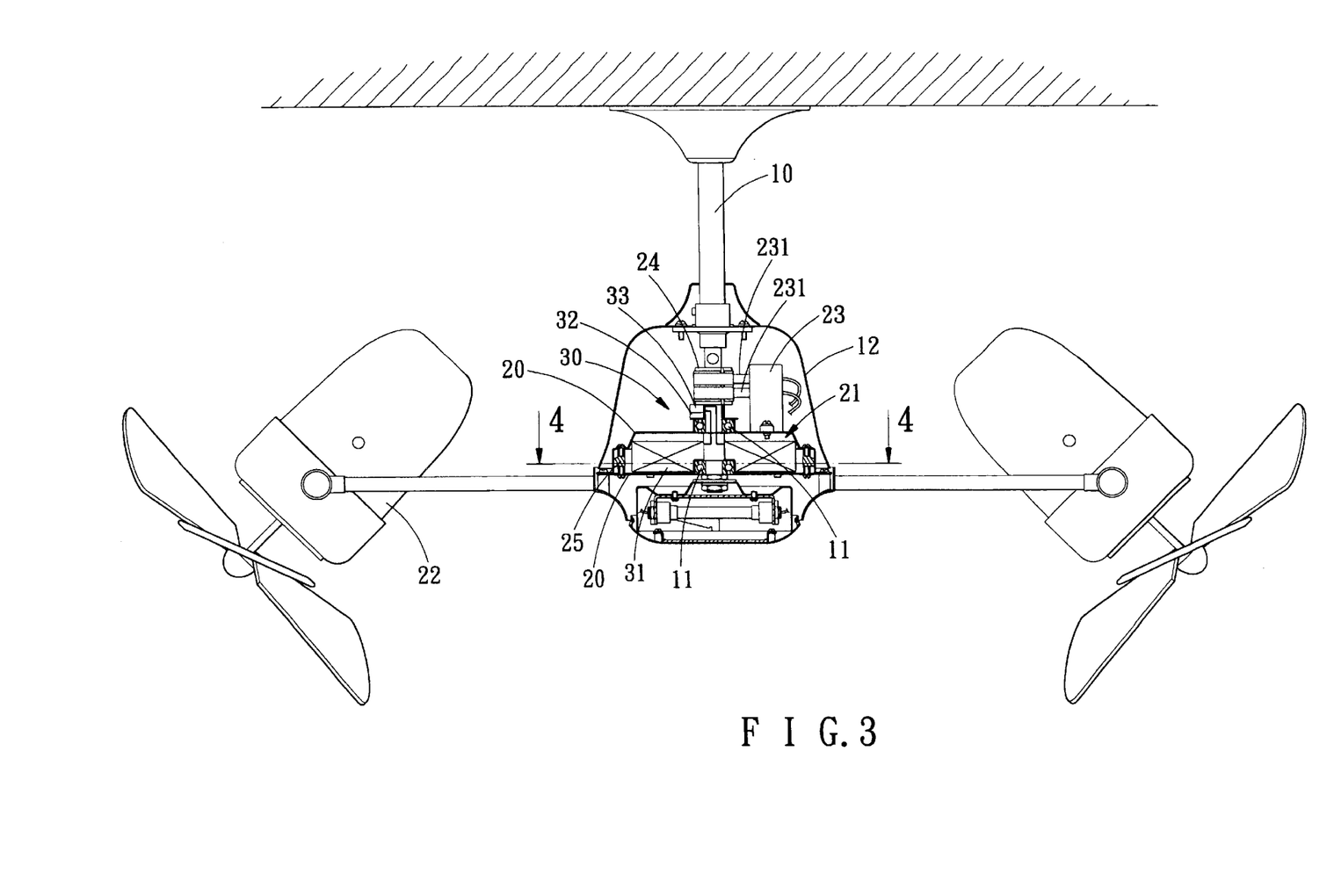
FIG. 3 shows the multi-fan assembly of the present invention.
Figure 4:
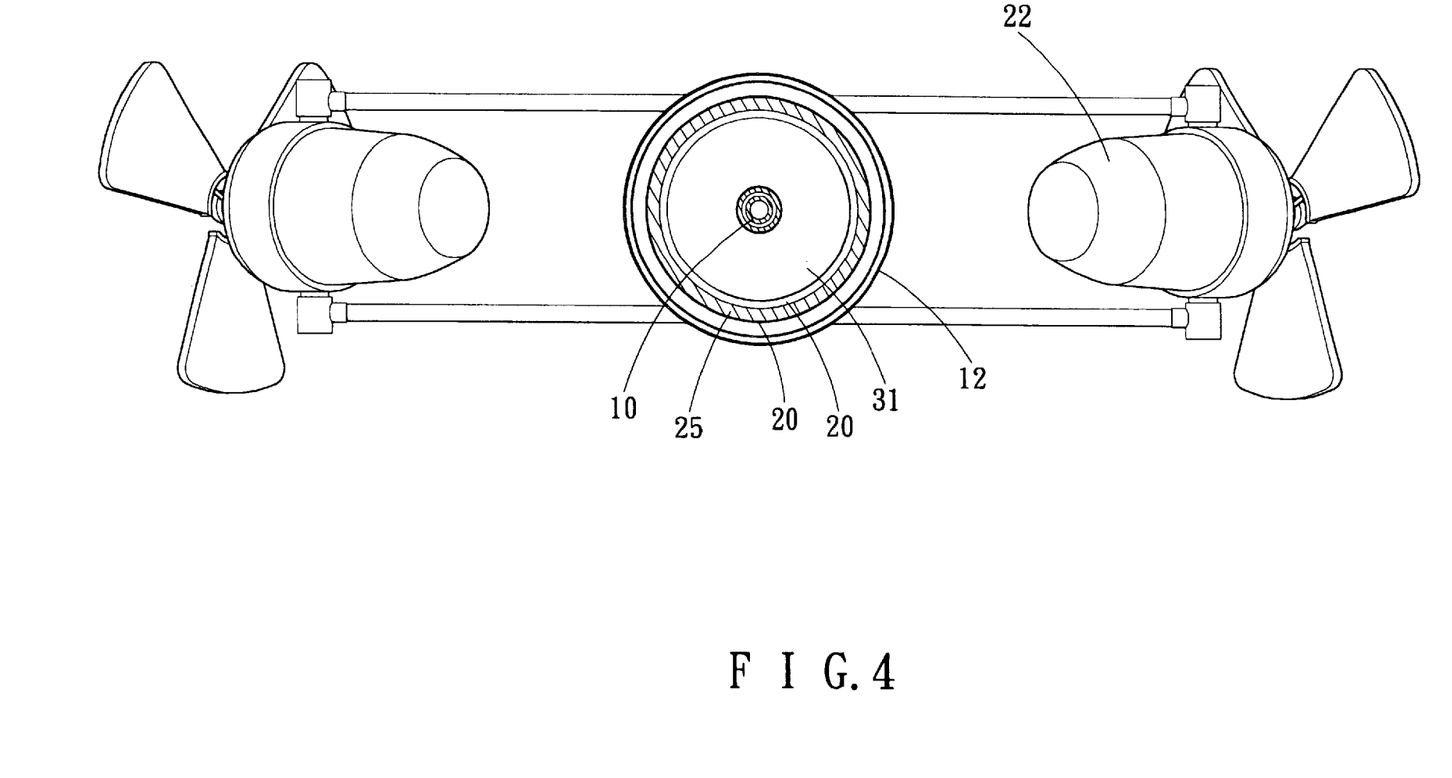
FIG. 4 is a top view to show the multi-fan assembly of the present invention.

Referring to FIGS. 3 and 4, the multi-fan assembly of the present invention comprises a central main shaft 10 fixed to a ceiling and a plurality of bearings 11 mounted to the central main shaft 10 and a casing 12 is connected to the central main shaft 10. A rotatable member 20 is rotatably connected to a distal end of the central main shaft 10 and includes a space 21 therein. Two member fans 22 are connected to the rotatable member 20 by two revolving arms. A base 23 is connected to the rotatable member 20 and includes two conductive members 231. The base 23 is located below the casing 12.

Two conductive pieces 24 are connected to the central main shaft 10 and is electrically connected to the power supply and the conductive pieces 24 are slidably connected to the two conductive members 231. The two conductive members 231 transfer electric power to the two member fans 22.

A control unit 30 includes a metal magnetic induction mask 25 which is fixedly received in the space 21 in the rotatable member 20, a magnetic flux coil 31 fixed to the central main shaft 10 and a current control unit 33. The magnetic flux coil 31 is composed of silicon steel core wrapped with copper wires and is fixed to the central main shaft 10 and snugly surrounded the magnetic induction mask 25. The magnetic flux coil 31 is received in the space 21 in the rotatable member 20. When provided with a current from the current control unit 33, the magnetic flux coil 31 will produce a magnetic flux which magnetizes the wrapped silicon steel core of the magnetic flux coil 31 to attract the magnetic induction mask 25 thereby creating a magnetic counter force or anti-rotation binding force to resist the rotation of the rotatable member 20 and consequently the revolution of the multi-fan assembly round its central main shaft 10 is reduced.

When in use, the user may use a wall control switch or a hand held remote control unit to determine the level of electric current generated by the current control unit 30; if a slower revolution is needed, the user can just increase the level of current to create a larger magnetic counter (binding) force to partially offset the revolution torque naturally generated on the rotatable member 42 by the self rotation of the two member fans 22. When the current is raised to its maximum level, the effect of revolution will disappear because the magnetic counter force (or binding force), so generated will completely offset the revolution torque. On the other hand, if a faster revolution is required, the user may just decrease the level of current going into the magnetic flux coil to produce a smaller magnetic counter force to partially offset the revolution torque. When the current is cut off to zero, there will be no counter force to offset the revolution torque and consequently the two member fans revolve freely at its maximum revolving speed.

Aside from the above described manual control of revolving speed of the two member fans, an automatic control device can also be implemented by adapting a speed detecting sensor 32 to the current control unit 33. As shown in FIG. 3, the current control unit 33 is connected with a speed detecting sensor 32 which sends speed information to the current control unit 33 for action of adjusting current level to stabilize the revolving speed of the two member fans 22 at a pre-set level or within an acceptable operating range.

Figure 5:
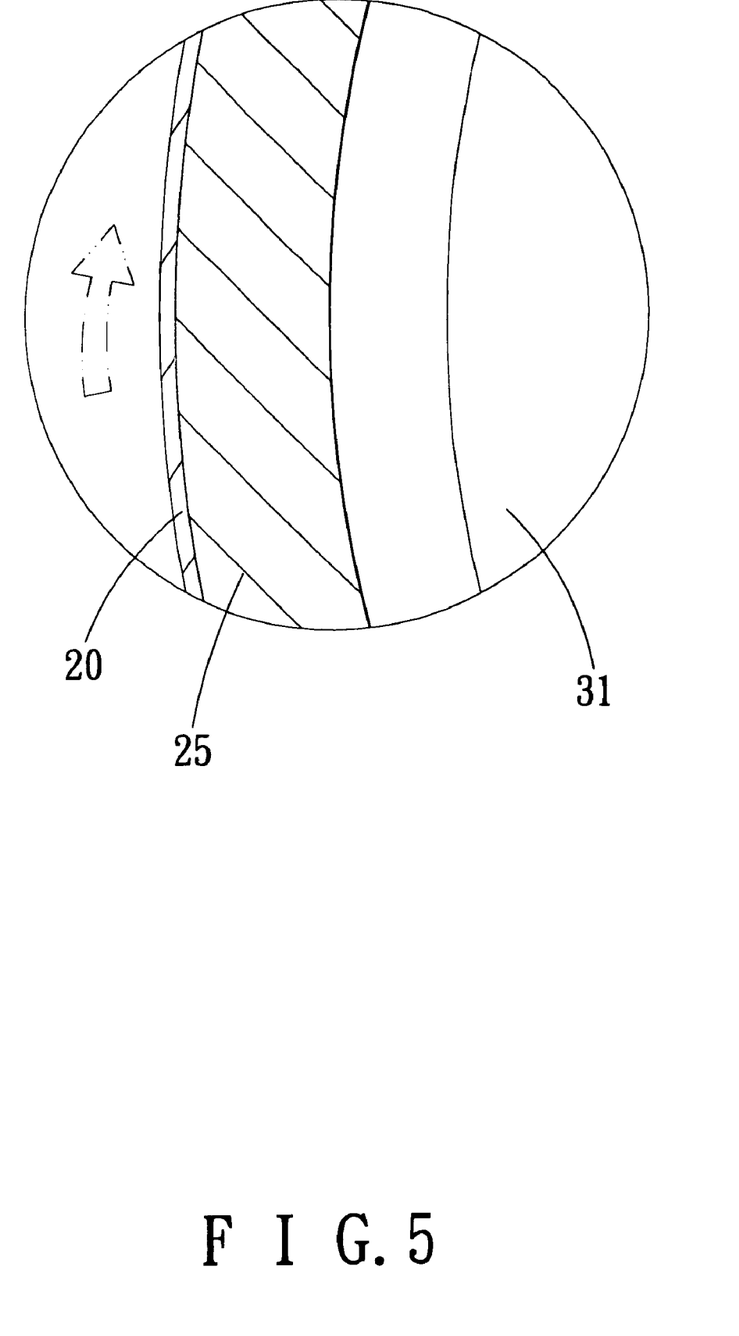
FIG. 5 shows that no counter force applied to the rotatable member of the multi-fan assembly of the present invention.

As shown in FIG. 5, when the two member fans 22 are set at low speed of self rotation, the speed detecting sensor 32 detects the speed of the rotatable member 42 being low therefore it gives a signal to the current control unit 33 to provide only a minimum or even zero current input to the magnetic flux coil 31 to generate a magnetic force barely sufficient to maintain the revolving speed.

Figure 6:
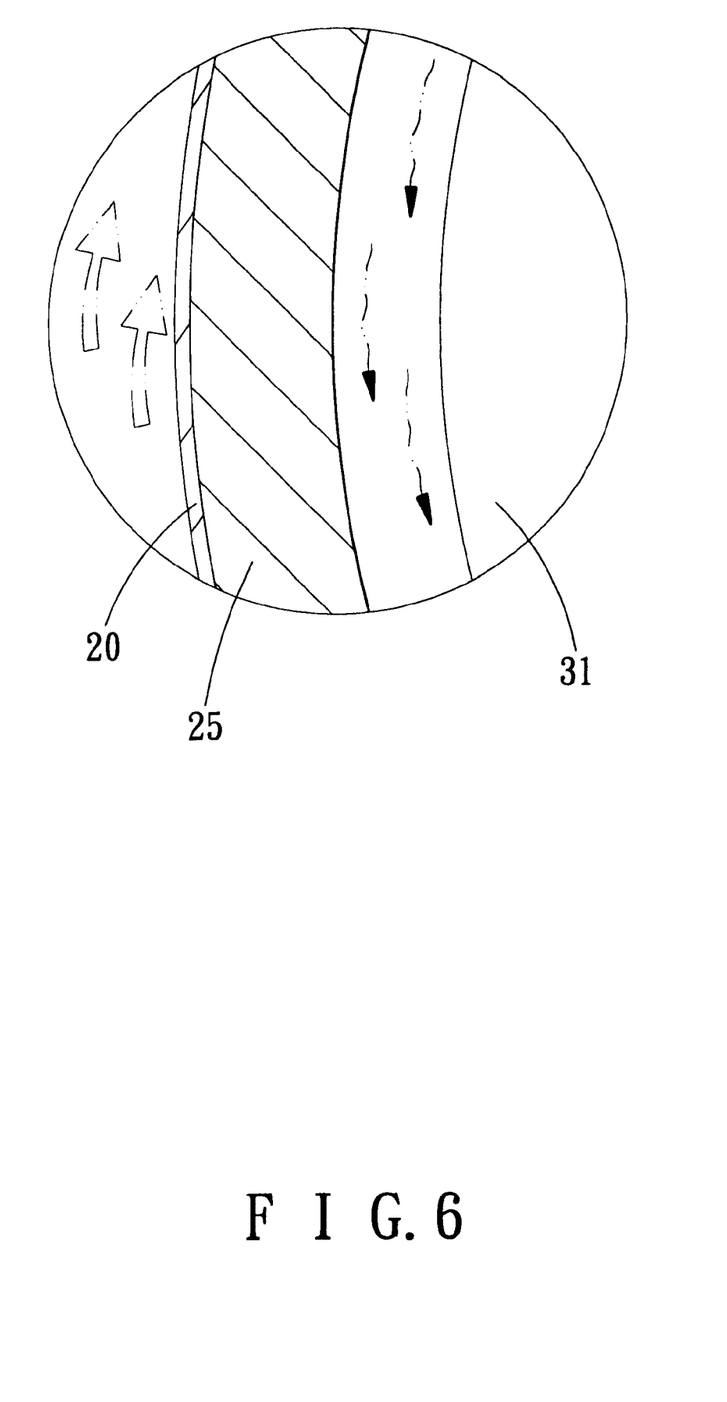
FIG. 6 shows that the magnetic flux generates a counter force applied to the rotatable member of the multi-fan assembly of the present invention.
Figure 7:
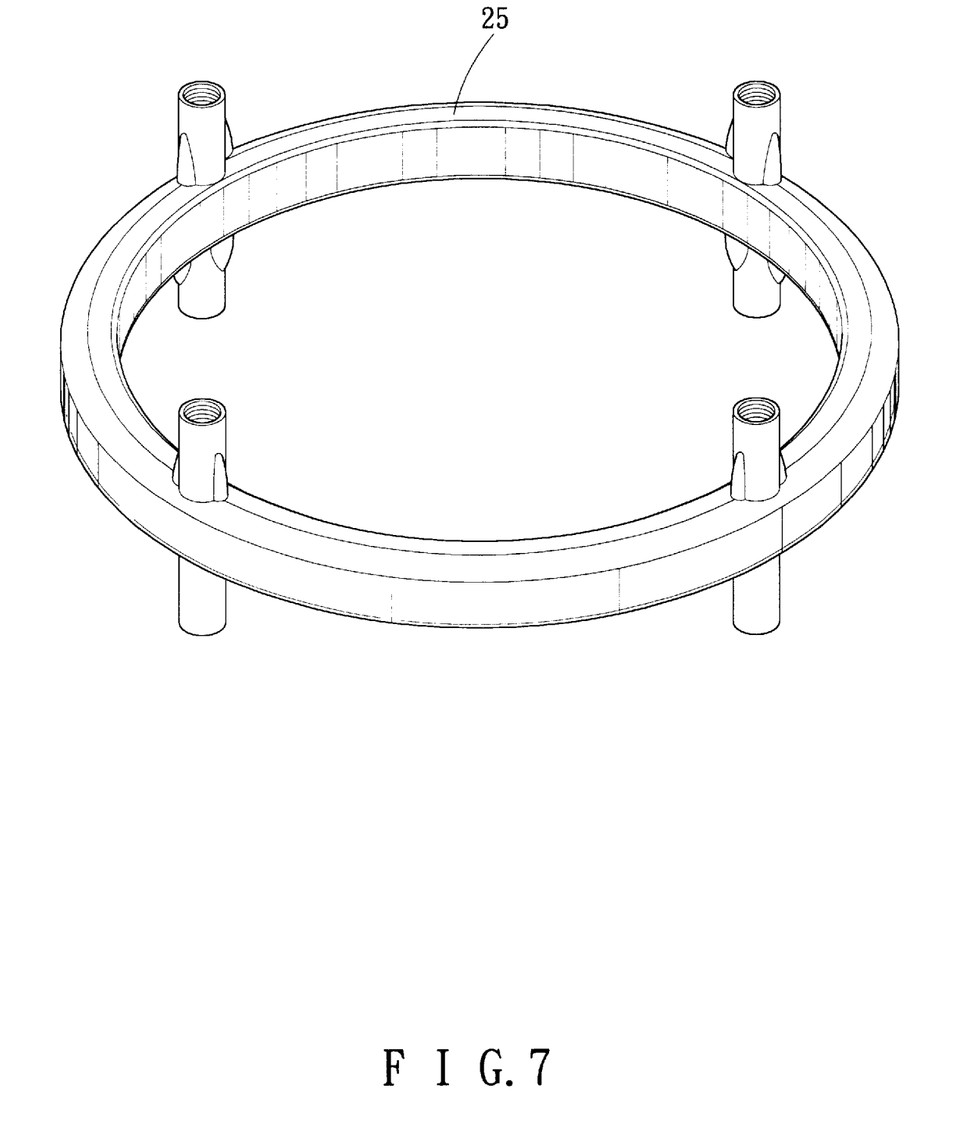
FIG. 7 is a perspective view of the magnetic induction mask with the array of silicon steel at 0° angle against the vertical axis.

As shown in FIG. 6, when the two member fans are set at high speed of self rotation, the speed detecting sensor 32 detects the revolving speed of the rotatable member being high so it gives a signal to the current control unit 33 to provide a larger current to the magnetic flux coil 31 to generate a large magnetic flux to create a large magnetic counter force (or binding force) to slow down the revolving speed of the two member fans 22 round the central main shaft 10. The speed detecting sensor 32 can be an infra-red sensor, or a proximity sensor or a counting system. The magnetic flux coil 31 is composed of a silicon steel core wrapped with copper wires. The arrangement of angle of the parallel silicon steel bars on the magnetic induction mask 25 can be changed to meet different requirements of resistance. When the array direction of the parallel silicon steel bars on the magnetic induction mask is at 0° angle against vertical axis as shown in FIG. 7, the magnetic force generated is a binding force to resist rotation. No reverse effect will occur even with input of any larger current level.

The current control unit 33 may be electrically wired to a remote control on a wall or it can be equipped with a wireless infra-red remote control device which sends signals to control the current. There are two types of switch design that can be applied to both the wall control and the wireless control. One is the variable switch design which offers a continuous range of current level for users to pick, the other is a multiple switch design which offers 3 (low, medium, high) or more fixed arrangements of different current level for users to choose for different revolution speeds. Aside from offering fixed arrangements of different current for controlling revolution at different speed, the multiple switch design can further be expanded to an unique application of setting the member fans in any desired direction for playing a non-revolving performance. This requires two more functional switches to work with; one is a direction searching switch which sets the control current to an almost maximum level so that the revolution becomes slow enough for users to choose the exact direction to lock in, and the other one is a position locking switch which sets the control current to the maximum level so that the magnetic binding force is large enough to stop the revolution at once. By playing with these two functional switches together, users can turn the member fans to any direction wanted and lock in the direction for a non-revolving performance.

The electromagnetic control device therefore not only can control the revolving speed of the multi-fan assembly but also can manage the multi fan assembly to standstill in any direction for a non-revolving performance.

While we have shown and described the embodiment in accordance with the present invention, it should be clear to those skilled in the art that further embodiments may be made without departing from the scope of the present invention.

What is claimed is:

1. A multi-fan assembly comprising:

a central main shaft and a rotatable member rotatably connected to the central main shaft, two conductive members connected to the rotatable member through a base, two member fans connected to the rotatable member by two rotating arms, two conductive pieces mounted on the central main shaft and slidably connected the two conductive members transferring power to the two member fans, a control unit including a magnetic induction mask fixedly received in a space in the rotatable member, a magnetic flux coil fixed to the main shaft and snugly surrounded by the magnetic induction mask, and a current control unit which controls the current provided to the magnetic flux coil, the magnetic induction mask and the rotatable member magnetically attracted by the magnetic flux coil thereby generating an anti-revolution or revolution resistant force to partially or completely offset the revolution torque naturally generate on the rotatable member by the self rotation of the two member fans, the revolving speed of the two member fans being manageable at user's discretion through manipulation of the current control unit.

2. The assembly as claimed in claim 1, wherein the current control unit is electrically connected to a control switch mounted on a wall.

3. The assembly as claimed in claim 1, wherein current control unit is equipped with a wireless infra-red remote control device which sends a signal to control the current output from the current control unit.

4. The assembly as claimed in claim 2 and claim 3, the switch design on both control unit can be a variable switch design which offers a continuous range of current level for consumers to pick in order to determine a desired revolution speed.

5. The assembly as claimed in claim 2 and claim 3, the switch design can be a multiple switch design which offers three (low, medium, high) or more fixed arrangements of different current levels.

6. The assembly as claimed in claim 5, wherein the multiple switch design can be expanded to create a new function of setting the member fans in any desired directions for playing a non-revolving performance by a cooperating with two functional switches to work with, one of the functional switches being a direction searching switch which sets the control current to a next to maximum level so that the revolution becomes slow enough for user to choose, the exact direction to lock in, the other functional- switch being a position locking switch which sets the control current to a maximum level so that the magnetic binding force is large enough to stop the revolution at once, by playing with these two functional switches, users can turn the member fans to any direction wanted and lock in the direction for a non-revolving performance.

7. The assembly as claimed in claim 1, further comprising a speed detecting sensor which monitors the rotating speed of the rotatable member and the revolving speed of the fan assembly, and sends the speed information to the current control unit for action of necessary current adjustment in order to stabilize the revolution at a pre-set speed level or within an acceptable operating range.

8. The assembly as claimed in claim 7, wherein the speed sensor uses an infra-red design for speed detection.

9. The assembly as claimed in claim 7, wherein the speed sensor is sensored by using a proximity sensor.

10. The assembly as claimed in claim 1, wherein the magnetic flux coil is composed of a silicon steel core wrapped with copper wires, the arrangement of angles and directions of the parallel silicon steel bar on the magnetic induction mask vis-a-vis the copper wires can be changed to meet different requirements of resistance which could either be a counter force or a binding force.

11. The assembly as claimed in claim 1, wherein the magnetic induction mask is composed of array of inductible metal bars snuggly connected and mutually insulated to each: other and parallelly fixed along an inner circular wall of the magnetic induction mask.

* * * * *